UNITED STATES PATENT OFFICE.

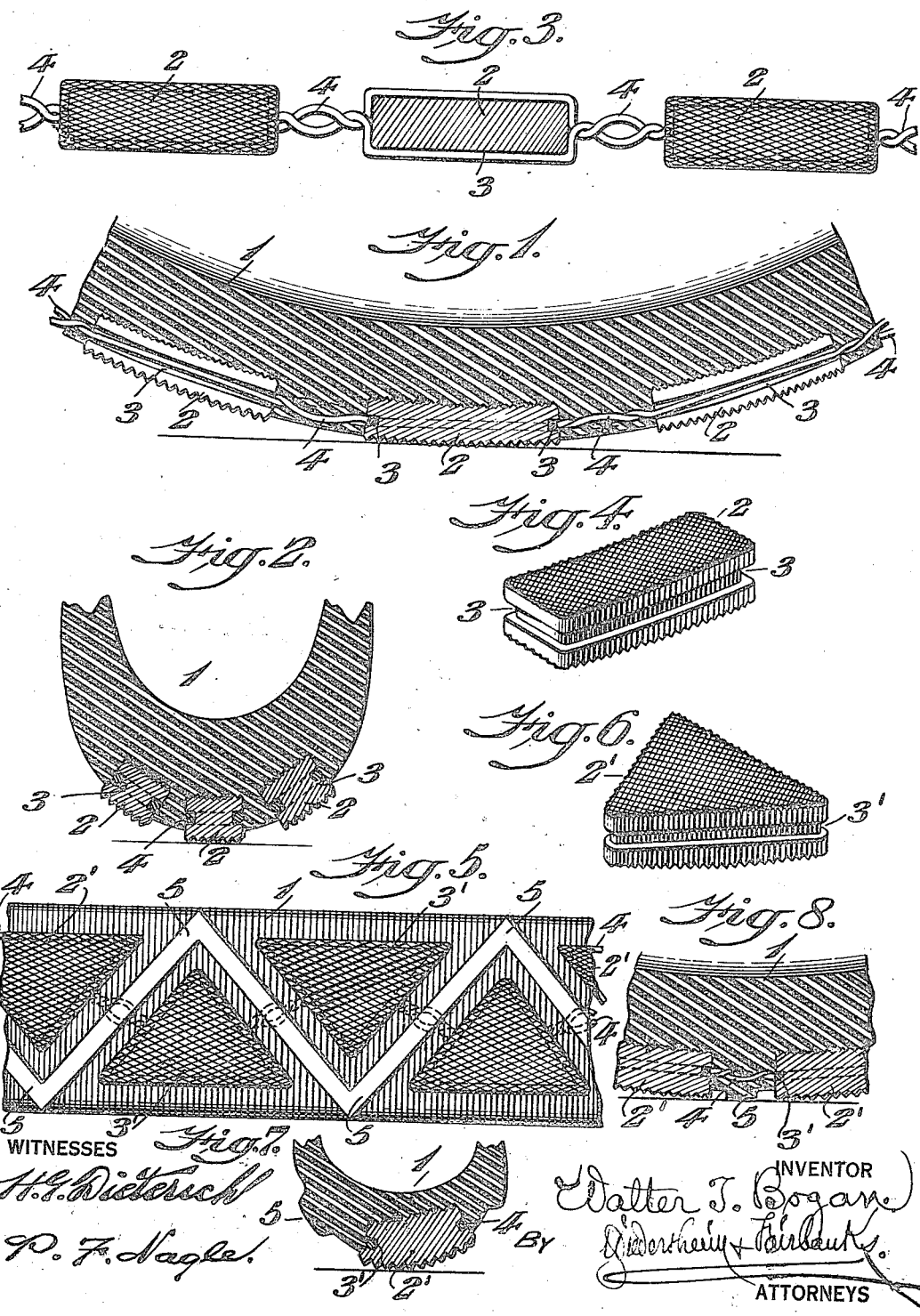

WALTER T. BOGAN, OF PHILADELPHIA, PENNSYLVANIA, ASSIGNOR OF ONE-HALF TO WILLIAM W. PORTER, OF PHILADELPHIA, PENNSYLVANIA.

TIRE.

1,170,497.

Specification of Letters Patent.

Patented Feb. 1, 1916.

Application filed May 11, 1915. Serial No. 27,297.

*To all whom it may concern:*

Be it known that I, WALTER T. BOGAN, a citizen of the United States, residing in the city and county of Philadelphia, State of Pennsylvania, have invented a new and useful Tire, of which the following is a specification.

My invention consists in providing a tire with studs or blocks which are adapted to project in part from the tread thereof, so as to take hold of the road bed and prevent slipping or skidding of the wheel, while also strengthening the tread portion of the tire, said studs or blocks being connected, whereby they are prevented from creeping in the tire.

It consists also in providing the tread with ribs which project from the surface of the same and assist further in preventing slipping or skidding of the wheel.

The invention is satisfactorily illustrated in the accompanying drawing, but the important instrumentalities thereof may be varied, as long as they are included in the scope of the claims.

Figure 1 represents a longitudinal section of a tire embodying my invention. Fig. 2 represents a transverse section thereof. Fig. 3 represents a plan view partly sectional of a chain of studs or blocks employed. Fig. 4 represents a perspective view of one of said studs or blocks. Fig. 5 represents a view of a tread showing other embodiments of the invention. Fig. 6 represents a perspective view of one of the studs or blocks shown in Fig. 5. Fig. 7 represents a transverse section of Fig. 5. Fig. 8 represents a longitudinal section thereof.

Similar numerals of reference indicate corresponding parts in the figures.

Referring to the drawings, 1 designates a section of a tire formed of rubber or other material usual in such cases.

2 designates studs or blocks of rigid material which are embedded partly in the tread portion of the tire and project partly therefrom, so as to appear on said tread portion at intervals whereby when the wheel rotates, said studs or blocks are frictionally in contact with the road bed. Some of the surfaces of the studs or blocks that are in the tire are serrated, so as to be united more firmly to the material thereof, and the surfaces outside of the same are also serrated, so as to take firm hold of the roadway, so as to assist in preventing slipping or skidding of the tire thereon. The studs or blocks have grooves in their sides forming the reduced necks 3 around which are passed the stringers 4 which extend from one stud or block to the other, forming a chain of the latter, said stringers being twisted or otherwise bent between the studs or blocks, so as to be retained on the same and hold them spaced apart, they being embedded in the material of the tire, the walls of the necks 3 being also embedded in said material and thereby interlocking therewith, and so said necks and stringers assist in retaining the studs or blocks in position, and preventing them from creeping. The stringers are wrapped and closed tightly around the grooves of each block and then continued between the blocks where they are joined, as by twisting or bending, thus spacing the blocks and preventing them from creeping toward and away from each other. As the stringers are positioned on the blocks in the grooves or necks thereof, they cannot slip therefrom and vice versa, in assembling the blocks and stringers in building up the tire. In order to assist still further in preventing the tire from slipping or skidding the tread of the same has formed thereon the ribs 5, see Figs. 5, 7 and 8, which extend around the same angularly obliquely in transverse direction and project from the tread so as to present their edges obliquely to the roadway and take firm hold of the same, the effect of which is evident. The studs or blocks may be of various forms, they being shown quadrilateral as at 2 in Figs. 1, 2, 3, and 4, and triangular as at 2' with reduced necks 3', as in Figs. 5, 6, 7 and 8.

In Figs. 5 and 6 the ribs 5 are shown as alternating with the portions of the studs or blocks that are exterior of the tread of the tire, so as to engage with the road bed in succession, and said ribs are shown as extending zigzag so as to present long surfaces to the road.

Having thus described my invention what I claim as new and desire to secure by Letters Patent, is:—

1. In a tire, a tread portion formed of resilient material and blocks of rigid material partly embedded in said portion and partly appearing outside of the same at intervals, and stringers disposed in grooves in said blocks and tightly affixed thereto, said stringers being united between the blocks and spacing the latter and preventing their creeping toward or from each other.

2. In a tire, a tread portion formed of resilient material and blocks of rigid material partly embedded in said portion and partly appearing outside of the same at intervals, and stringers encircling said blocks and tightly affixed thereto, said stringers being united between the blocks and spacing the latter and preventing their creeping toward or from each other.

WALTER T. BOGAN.

Witnesses:
JOHN A. WIEDERSHEIM,
N. BUSSINGER.

Copies of this patent may be obtained for five cents each, by addressing the "Commissioner of Patents, Washington, D. C."